United States Patent
Chapman et al.

(10) Patent No.: US 10,660,734 B1
(45) Date of Patent: May 26, 2020

(54) DENTAL ALIGNER PACKAGING

(71) Applicant: SmileDirectClub LLC, Nashville, TN (US)

(72) Inventors: Josh Chapman, Nashville, TN (US); Brittany Lacey, Nashville, TN (US)

(73) Assignee: SmileDirectClub LLC, Nashville, TN (US)

( * ) Notice: Subject to any disclaimer, the term of this patent is extended or adjusted under 35 U.S.C. 154(b) by 0 days.

(21) Appl. No.: 16/290,113

(22) Filed: Mar. 1, 2019

Related U.S. Application Data

(60) Provisional application No. 62/783,701, filed on Dec. 21, 2018.

(51) Int. Cl.
*A61C 19/02* (2006.01)
*A61C 7/08* (2006.01)
*B65B 5/08* (2006.01)

(52) U.S. Cl.
CPC .............. *A61C 19/02* (2013.01); *A61C 7/08* (2013.01); *B65B 5/08* (2013.01); *A61C 2202/00* (2013.01)

(58) Field of Classification Search
CPC ....... A61C 19/02; A61C 7/08; A61C 2202/00; B65D 5/08
USPC ...................................................... 206/570
See application file for complete search history.

(56) References Cited

U.S. PATENT DOCUMENTS

| | | | | |
|---|---|---|---|---|
| 2,584,048 A | * | 1/1952 | Ramsey | A45C 5/03 190/109 |
| 4,241,833 A | * | 12/1980 | Luebcke | A61F 17/00 206/373 |
| D265,346 S | * | 7/1982 | Maier | D24/230 |
| 4,739,809 A | * | 4/1988 | Adams | A45C 3/00 150/112 |
| 4,763,791 A | * | 8/1988 | Halverson | A61C 9/00 206/369 |
| 5,190,168 A | * | 3/1993 | French | A61C 9/0006 211/59.2 |
| 5,207,303 A | * | 5/1993 | Oswalt | A45C 13/02 190/108 |
| 5,240,415 A | * | 8/1993 | Haynie | A61C 19/066 433/216 |
| 5,245,117 A | * | 9/1993 | Withers | A61M 5/3205 206/366 |
| 5,269,599 A | * | 12/1993 | Moring | A47B 46/005 312/290 |
| 5,346,061 A | * | 9/1994 | Newman | A61C 19/06 206/221 |
| 5,460,527 A | * | 10/1995 | Kittelsen | A61C 19/063 433/215 |
| 5,655,653 A | * | 8/1997 | Chester | A61C 7/00 206/438 |
| 5,863,202 A | * | 1/1999 | Fontenot | A61C 19/02 433/215 |

(Continued)

*Primary Examiner* — Ernesto A Grano
(74) *Attorney, Agent, or Firm* — Foley & Lardner LLP

(57) ABSTRACT

Described herein are systems and methods for packaging dental aligners. A container for dental aligners includes a top compartment, a bottom compartment, and a plurality of individually packaged dental aligners separably connected in a strip. The bottom compartment is configured to receive the plurality of individually packaged dental aligners. The bottom compartment further includes a slot through which an individually packaged dental aligner can be pulled and separated from the strip.

20 Claims, 11 Drawing Sheets

(56) References Cited

U.S. PATENT DOCUMENTS

| | | | | |
|---|---|---|---|---|
| 5,882,192 A * | 3/1999 | Bergersen | | A61C 7/00 433/2 |
| 5,975,893 A * | 11/1999 | Chishti | | A61C 7/00 |
| 6,206,192 B1 * | 3/2001 | Winstead | | A61C 19/02 206/369 |
| 6,267,078 B1 * | 7/2001 | Pina | | A01K 1/0107 119/165 |
| 6,312,258 B1 * | 11/2001 | Ashman | | A61C 8/00 206/369 |
| 6,422,386 B1 * | 7/2002 | Wiese | | A45C 5/00 206/373 |
| 6,923,319 B1 * | 8/2005 | Erickson | | A61M 5/008 206/366 |
| 6,981,874 B2 * | 1/2006 | Allred | | A61C 19/063 433/215 |
| 7,011,523 B2 * | 3/2006 | Allred | | A61C 19/066 433/215 |
| 7,556,149 B2 * | 7/2009 | Erickson | | A61M 5/002 206/365 |
| 8,181,786 B1 * | 5/2012 | Alas | | A61C 15/00 206/570 |
| 8,631,931 B2 * | 1/2014 | Patenaude | | A45D 44/20 206/63.5 |
| D765,388 S * | 9/2016 | Suess | | D3/203.3 |
| D845,636 S * | 4/2019 | Porter | | D4/104 |
| 2003/0008259 A1 * | 1/2003 | Kuo | | A61C 7/00 433/6 |
| 2003/0132129 A1 * | 7/2003 | Erickson | | A61M 5/3205 206/366 |
| 2004/0091839 A1 * | 5/2004 | Fischer | | A61C 1/12 433/226 |
| 2005/0003319 A1 * | 1/2005 | Kuo | | A61C 7/08 433/6 |
| 2005/0186539 A1 * | 8/2005 | McLean | | A61C 19/063 433/215 |
| 2005/0247722 A1 * | 11/2005 | Blocker | | A61F 15/002 221/119 |
| 2006/0127834 A1 * | 6/2006 | Szwajkowski | | A61C 7/00 433/2 |
| 2006/0175272 A1 * | 8/2006 | Wen | | A61C 19/02 211/70.6 |
| 2007/0062842 A1 * | 3/2007 | Bender | | A61B 10/0096 206/569 |
| 2007/0114139 A1 * | 5/2007 | Moore | | A61C 19/02 206/63.5 |
| 2007/0129269 A1 * | 6/2007 | Arce | | A61C 17/036 510/116 |
| 2007/0205116 A1 * | 9/2007 | Wu | | A61C 19/00 206/83 |
| 2008/0050693 A1 * | 2/2008 | Fischer | | A61C 19/063 433/25 |
| 2008/0156667 A1 * | 7/2008 | Huggins | | B44D 3/02 206/1.8 |
| 2008/0308450 A1 * | 12/2008 | Tchouangang | | A61C 19/02 206/570 |
| 2009/0114667 A1 * | 5/2009 | Sansoucy | | A61M 5/002 221/34 |
| 2010/0274205 A1 * | 10/2010 | Morelli | | A61M 1/0088 604/290 |
| 2011/0183293 A1 * | 7/2011 | Tchouangang | | A61C 13/0024 433/213 |
| 2011/0212412 A1 * | 9/2011 | Carlson | | A61C 19/02 433/79 |
| 2013/0180870 A1 * | 7/2013 | Nihei | | A61B 50/00 206/63.5 |
| 2014/0021215 A1 * | 1/2014 | Tran | | A47K 10/42 221/45 |
| 2015/0293070 A1 * | 10/2015 | Emmert | | B01D 61/364 436/126 |
| 2016/0324725 A1 * | 11/2016 | Horn | | A61J 7/04 |
| 2016/0367338 A1 * | 12/2016 | Cook | | A61C 9/0006 |
| 2017/0354486 A1 * | 12/2017 | Talavera-Peraza | | A61C 19/02 |
| 2018/0368941 A1 * | 12/2018 | Katzman | | A61C 7/02 |
| 2018/0368953 A1 * | 12/2018 | Katzman | | A61C 9/0006 |
| 2018/0368954 A1 * | 12/2018 | Katzman | | A61C 7/002 |
| 2019/0099241 A1 * | 4/2019 | Way | | A61C 7/008 |

\* cited by examiner

— continued —

DENTAL ALIGNER PACKAGING

This application claims the benefit of and priority to U.S. Provisional Patent Application No. 62/783,701, filed Dec. 21, 2018, which is hereby incorporated by reference in its entirety.

BACKGROUND

The present application relates generally to packaging dental aligners. More specifically, the present application relates generally to packaging dental aligners for improved user access to the dental aligners.

A vendor may use an impression or scan of a user's teeth to manufacture a dental aligner. The vendor may then send the dental aligner to the user. For example, the vendor may ship the dental aligner directly to the user or ship the dental aligner for pick-up by the user at a facility associated with the vendor.

In some cases, the vendor may manufacture a number of dental aligners for the user to use as part of a treatment plan for moving the user's teeth from initial positions to final, aligned positions. The aligners are designed to be worn in a particular sequential order to align the user's teeth to the final positions. However, it may be difficult for the user to determine the correct sequential order for wearing the aligners when the user receives more than a few dental aligners as part of the treatment plan.

SUMMARY

One embodiment relates to a container for dental aligners. The container includes a top compartment, a bottom compartment, and a plurality of individually packaged dental aligners separably connected in a strip. The bottom compartment is configured to receive the plurality of individually packaged dental aligners. The bottom compartment further includes a slot through which an individually packaged dental aligner can be pulled and separated from the strip.

Another embodiment relates to a method for packaging dental aligners. The method includes providing a container including a top and a bottom compartment and loading a plurality of individually packaged dental aligners separably connected in a strip in the bottom compartment. The bottom compartment further includes a slot through which an individually packaged dental aligner can be pulled and separated from the strip.

Another embodiment relates to a container for dental aligners. The container includes a top compartment, an insert configured to fit inside the top compartment, a bottom compartment configured to be pulled out of the container, and a plurality of individually packaged dental aligners separably connected in a strip in an order in which the dental aligners are intended to be worn by a user according to a treatment plan for the user. The bottom compartment is configured to receive the plurality of individually packaged dental aligners. The bottom compartment further includes a slot through which an individually packaged dental aligner can be pulled and separated from the strip without pulling out the bottom compartment.

DETAILED DESCRIPTION

Figure 1:
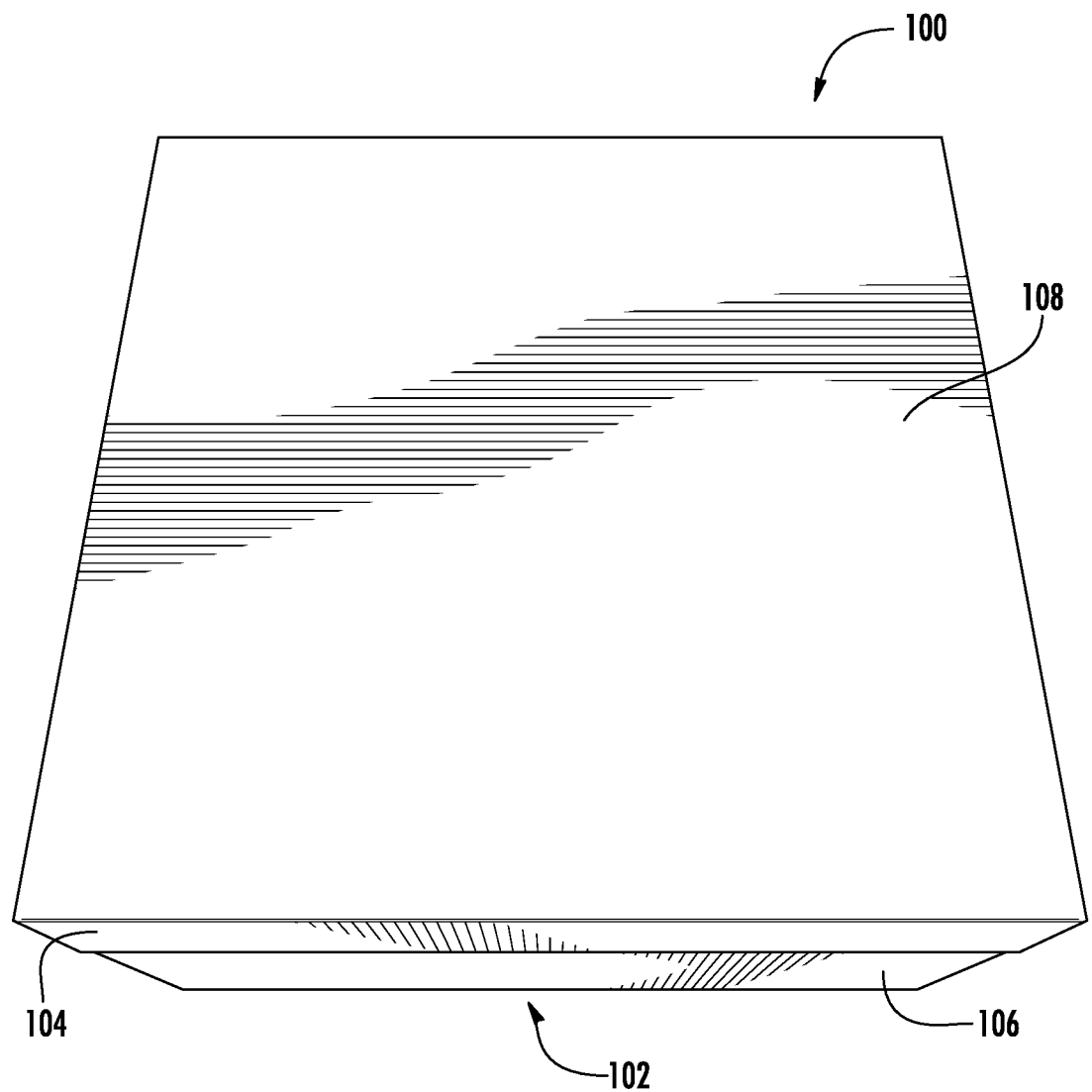
FIG. 1 is a top perspective view of a container for dental aligners, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described herein are systems and methods for packaging dental aligners. In various embodiments, a system receives one or more digital models representing alignment positions for a user's teeth. In one example, a user or a dental professional creates an impression of the user's teeth. The impression is then scanned to create a digital model of the user's current teeth positions (e.g., an "initial digital model"). Alternatively, or additionally, a dental professional uses a scanning system to create the initial digital model. Once the initial digital model is created, the digital model is used to create a digital model representing final aligned positions for the user's teeth (e.g., a "final digital model"), and the final digital model is used to create one or more digital models representing one or more intermediate alignment positions that the user's teeth will be guided through using dental aligners to reach the final aligned positions (e.g., "alignment digital model(s)") as part of a treatment plan.

Once the one or more alignment digital models have been created, dental aligners are fabricated corresponding to each of the one or more alignment digital models. In some embodiments, a fabrication system is used to manufacture one or more physical models, each physical model corresponding to an alignment digital model or to the final digital model. For example, a three-dimensional ("3D") printing machine may be used to fabricate the one or more physical models. Dental aligners are then fabricated using the one or more physical models. In some embodiments, the dental aligners are produced by thermoforming plastic sheets over the physical model(s). Additionally, in some embodiments, multiple dental aligners are fabricated for each physical model. As an example, three dental aligners may be fabricated for each digital model, with each of the three dental aligners having a different rigidity (e.g., based on a hardness of the material used to fabricate the dental aligner or based on the thickness of the material used to fabricate the dental aligner). By wearing the dental aligners (e.g., in a predetermined order or sequence), the teeth of the user are moved from their initial positions in the user's mouth to the final positions modeled in the final digital model.

Once a user's dental aligners have been fabricated, the dental aligners are provided to the user. In some embodiments, the dental aligners are shipped directly to the user. In other embodiments, the dental aligners are shipped to a location at which the user picks up the dental aligners (e.g., a retail location or other facility associated with the manufacturer of the dental aligners). Additionally, in some arrangements, some or all of the dental aligners produced for the user's treatment plan are provided to the user at one time. Because the user should wear the dental aligners in the predetermined order or sequence to align the user's teeth to the final positions, the packaging containing the dental aligners can be advantageously used to indicate to the user the order in which the dental aligners should be worn. Embodiments of such packaging are described below. This packaging may therefore alleviate confusion that the user may have in determining the correct order for the dental aligners, for example, based solely on markings on the dental aligners themselves. Furthermore, in some arrangements, the packaging may be used to provide other items to the user, such as dental supplies, supplies for care of the dental aligners, or supplies used to verify that the alignment of the user's teeth occurs as intended.

Figure 2:
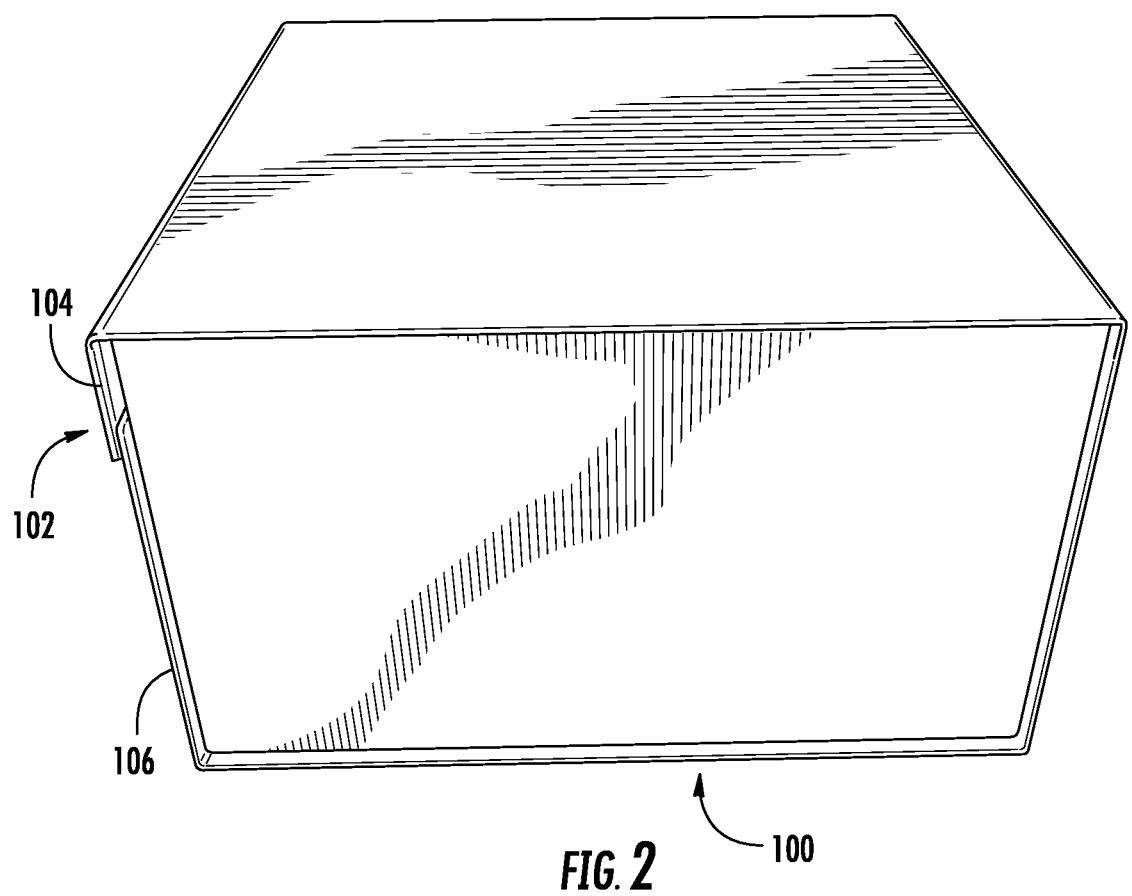
FIG. 2 is a side perspective view of the container of FIG. 1, according to an exemplary embodiment.

Referring now to FIG. 1, a top perspective view of an embodiment of a container 100 for dental aligners is shown. The container 100 is shaped as a square box, though in other embodiments, the container 100 may be shaped differently, such as shaped as another type of rectangular box, such as a cube, or shaped as a cylinder. As illustrated in FIG. 1, the container 100 includes a front fastener 102 configured to close the container 100 such that an interior of the container 100 is not accessible when the front fastener 102 is closed. For example, the front fastener 102 may be formed from a top flap 104 meeting and overlapping a bottom flap 106, as shown in FIG. 1. The overlapping top flap 104 and bottom flap 106 are further illustrated in FIG. 2, which shows a side perspective view of the container 100. As shown in FIG. 2, the top flap 104 is contiguous with a top side 108 of the container 100. In some embodiments, the front fastener 102 remains magnetically closed due to a combination of magnets in the top flap 104 and the bottom flap 106. In other embodiment, the front fastener 102 remains closed through a different mechanism, such as through a hook-and-loop material on the top flap 104 and the bottom flap 106 or due to the stiffness of a bend in the material of the top flap 104 and top side 108.

Figure 3:
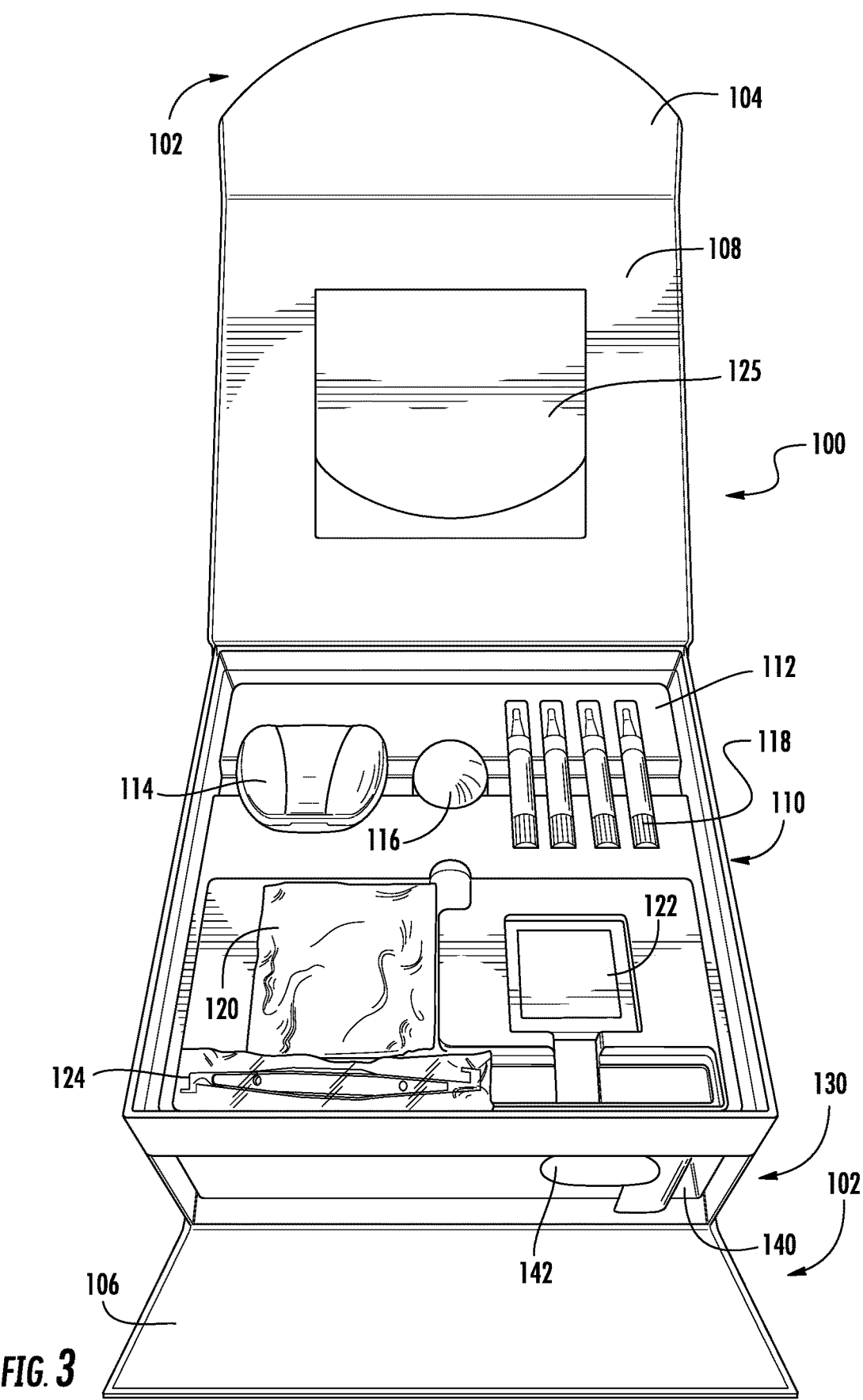
FIG. 3 is a top perspective view of the container of FIG. 1 with a top compartment opened, according to an exemplary embodiment.

Referring now to FIG. 3, a top perspective view of the container 100 with the front fastener 102 opened is shown. As illustrated in FIG. 3, the top flap 104 has been pulled back to expose a top compartment 110. In some arrangements, one or more ribbons or other flexible members may connect the top side 108 to the top compartment 110. For example, a ribbon may extend diagonally from an inside side of the top compartment 110 to a corresponding side of the top side 108 or top flap 104. The ribbon may provide tension between the top side 108 and the top compartment 110 and thus keep the top side 108 upright (e.g., keep the top side 108 from falling over) once the container 100 has been opened and a user lift the top flap 104 and top side 108 away from the top compartment 110.

Figure 4:
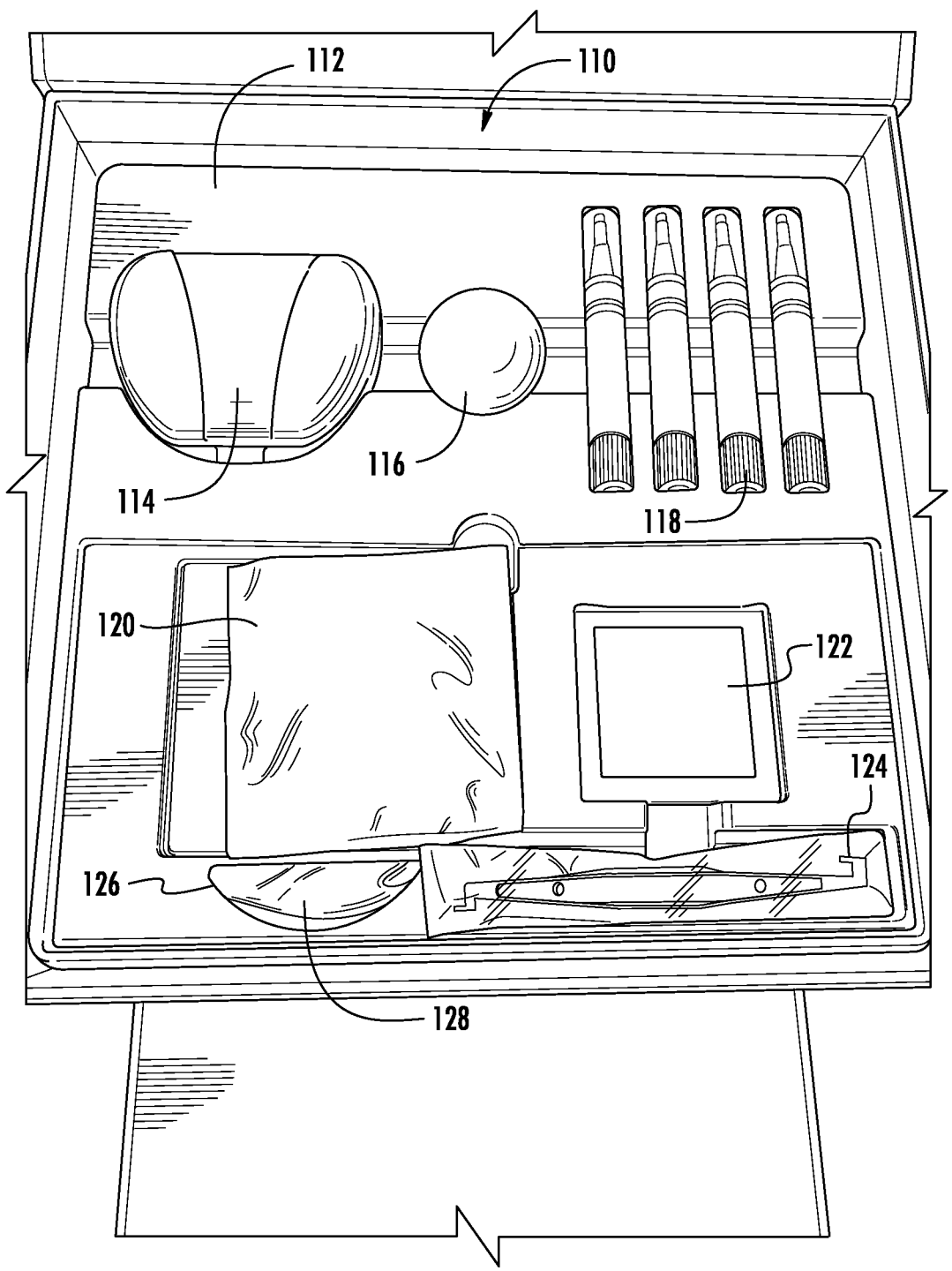
FIG. 4 is a top perspective view of the top compartment of FIG. 3, according to an exemplary embodiment.

In some embodiments, including the embodiment shown in FIG. 3, the top compartment 110 includes an insert 112. FIG. 4 illustrates another view of the top compartment 110 with the insert 112. As shown, the insert 112 may be configured to receive and contain dental supplies, dental aligner supplies, etc. For example, as illustrated in FIGS. 3 and 4, the insert 112 is configured to contain an aligner case 114 (e.g., for holding and protecting a dental aligner of the user when not in use), lip balm 116, containers of teeth whitener 118, a package of dental aligner seaters 120 (e.g., spongy cylinders of polymer for the user to bite down on in order to better seat a dental aligner on the user's teeth), a sticker and/or informational booklet 122, and a dental aligner removal tool 124 (e.g., shaped with a hooked end to help the user remove a dental aligner from the user's teeth). The top compartment 110 may also include information for the user on the use of the dental aligners and other items provided in the container 100, for example, stored in an envelope 125 located on the underside of the top side 108 of the container 100.

Figure 4A:
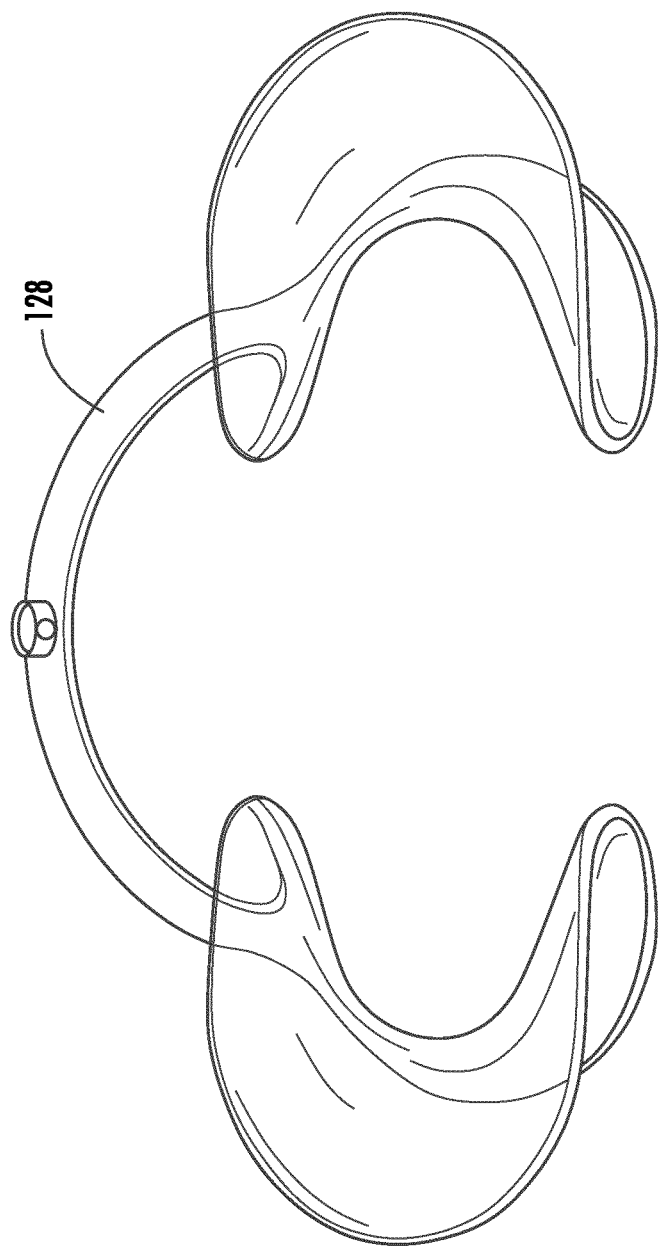
FIG. 4A is a top perspective view of a dental appliance from the top compartment of FIG. 3, according to an exemplary embodiment.

Additionally, in some embodiments, the insert 112 is configured as a raised, removable tray such that one or more items, such as dental supplies or dental aligner supplies, can be loaded and stored underneath the insert 112. The insert 112 can be removed to expose the stored items and subsequently placed back inside the top compartment 102. For example, as shown in FIG. 4, the insert 112 includes a cutout 126 that can be used to grasp and pull up the insert 112 to reveal one or more items stored underneath the insert 112. As an illustration, a dental appliance 128 may be stored underneath the insert 112. FIG. 4A illustrates a top perspective view of the dental appliance 128. As shown, the dental appliance 128 may be structured to hold open the user's upper and lower lips simultaneously while the user takes pictures of the user's teeth. The user may submit the pictures to the manufacturer of the dental aligners to verify that the user's teeth are aligning as planned.

Figure 5:
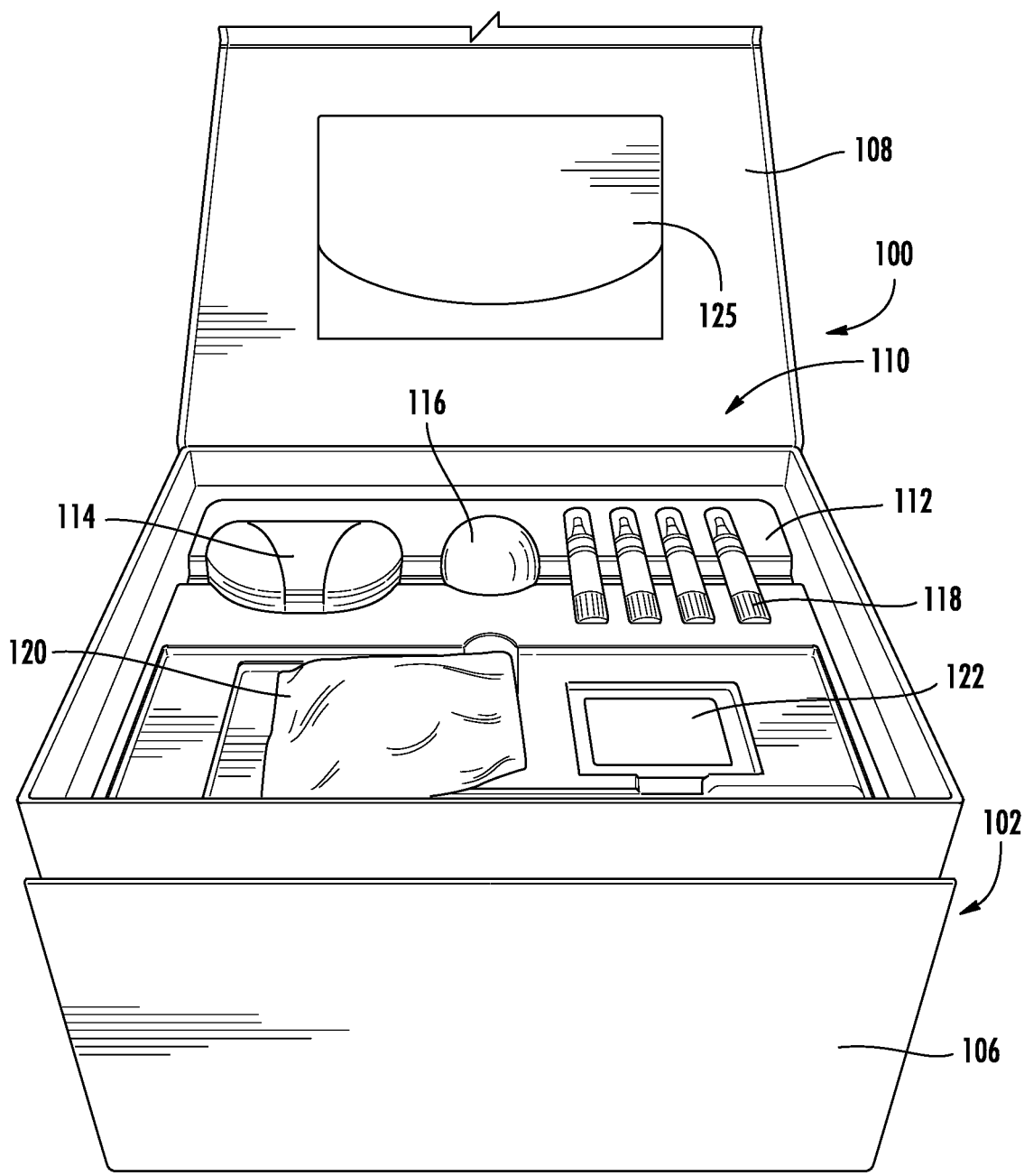
FIG. 5 is a side perspective view of the container of FIG. 1 with the top compartment opened, according to an exemplary embodiment.

Referring now to FIG. 5, a side perspective view of the container of FIG. 1 with the front fastener 102 opened is shown. As illustrated in FIG. 5, when the top flap 104 is pulled back to open the front fastener 102, the bottom flap 106 can rotate downward. In some embodiments, when the bottom flap 106 rotates downward, the bottom flap 106 exposes a bottom compartment 130 of the container 100. For example, the bottom compartment 130 may be configured to slide out of the container 100 horizontally for loading or removal of its contents.

Figure 6:
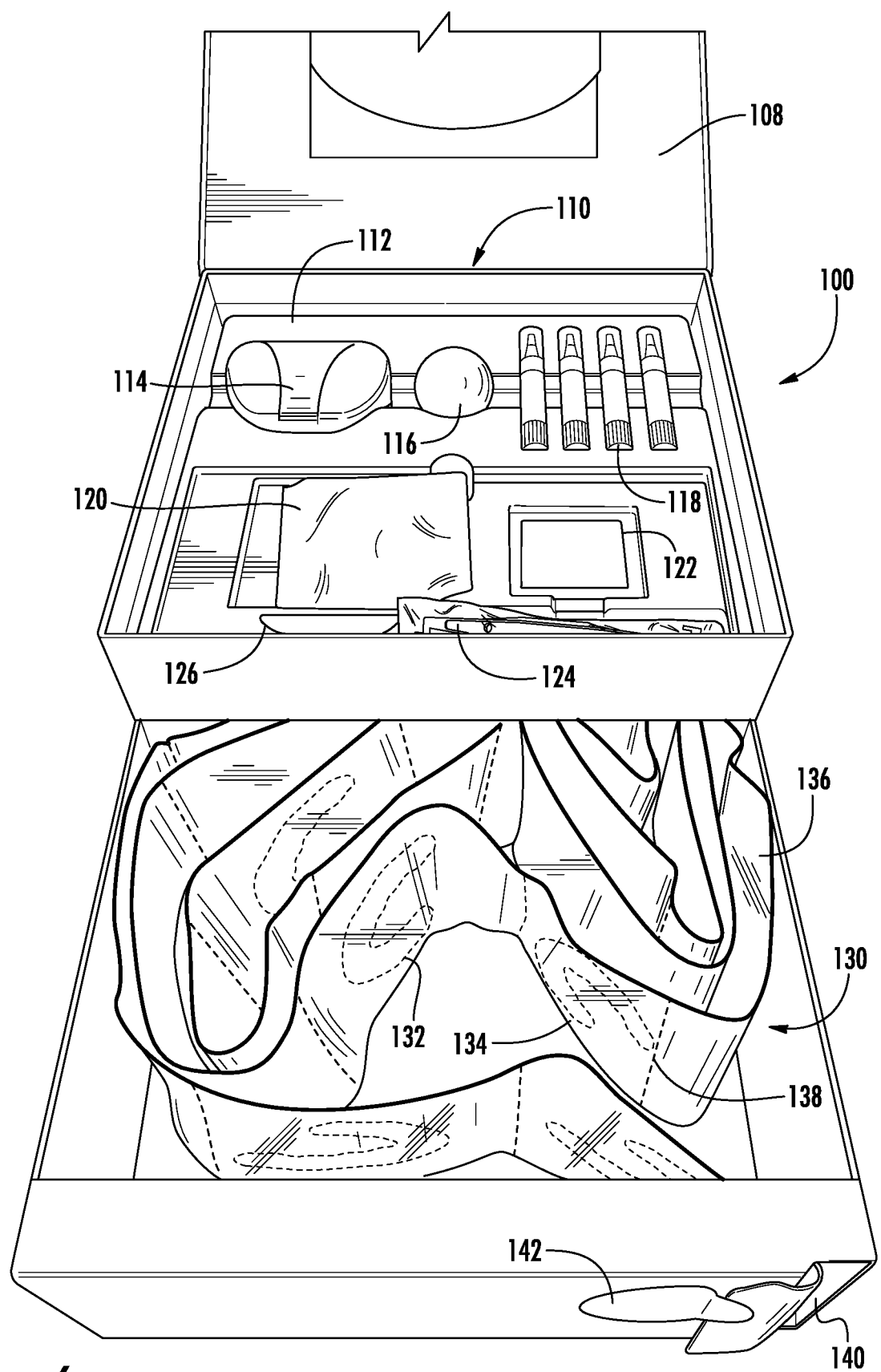
FIG. 6 is a top perspective view of the container of FIG. 1 with the top compartment opened and a bottom compartment opened, according to an exemplary embodiment.
Figure 7:
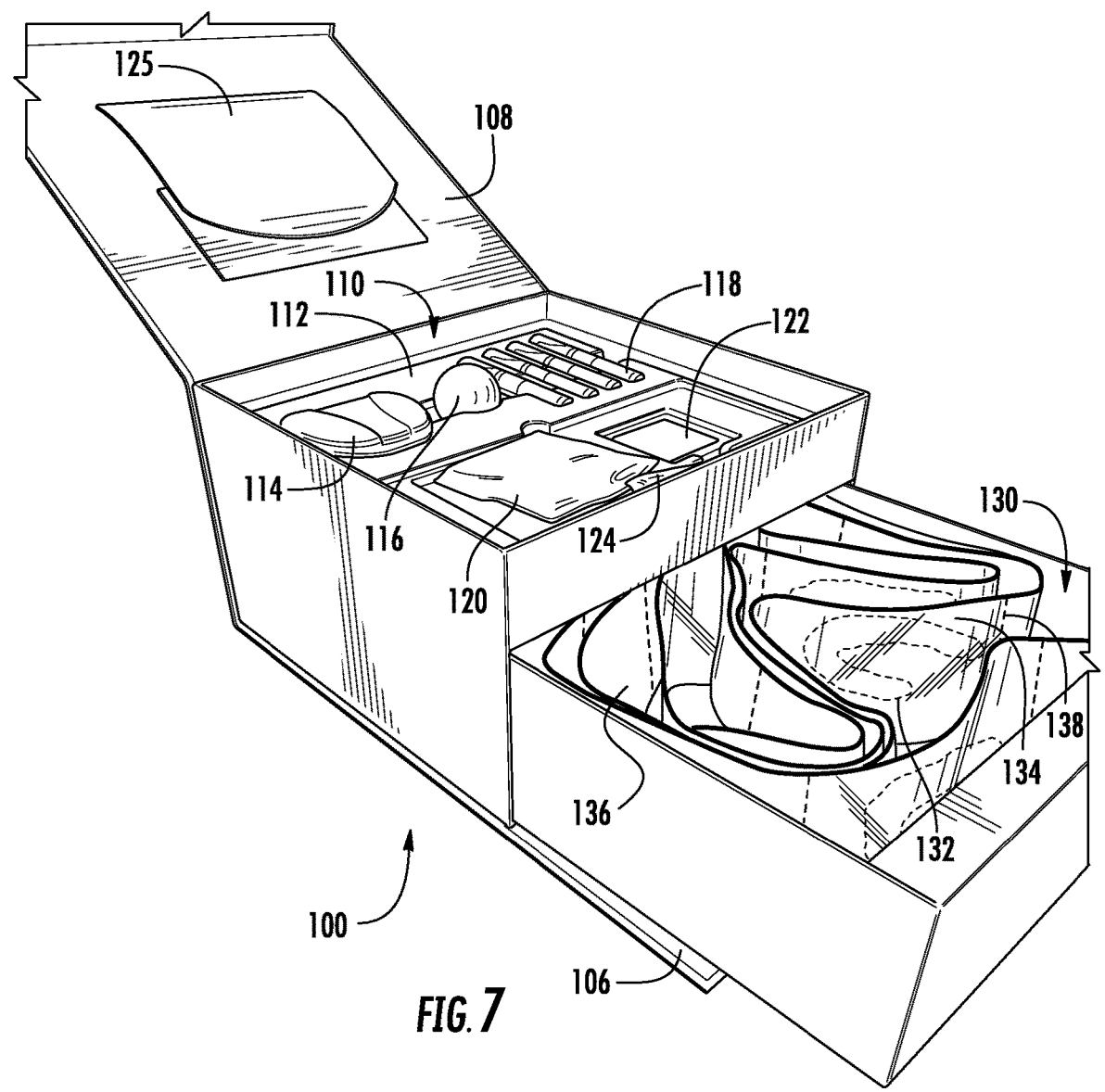
FIG. 7 is a side perspective view of the container of FIG. 1 with the top compartment opened and the bottom compartment opened, according to an exemplary embodiment.
Figure 8:
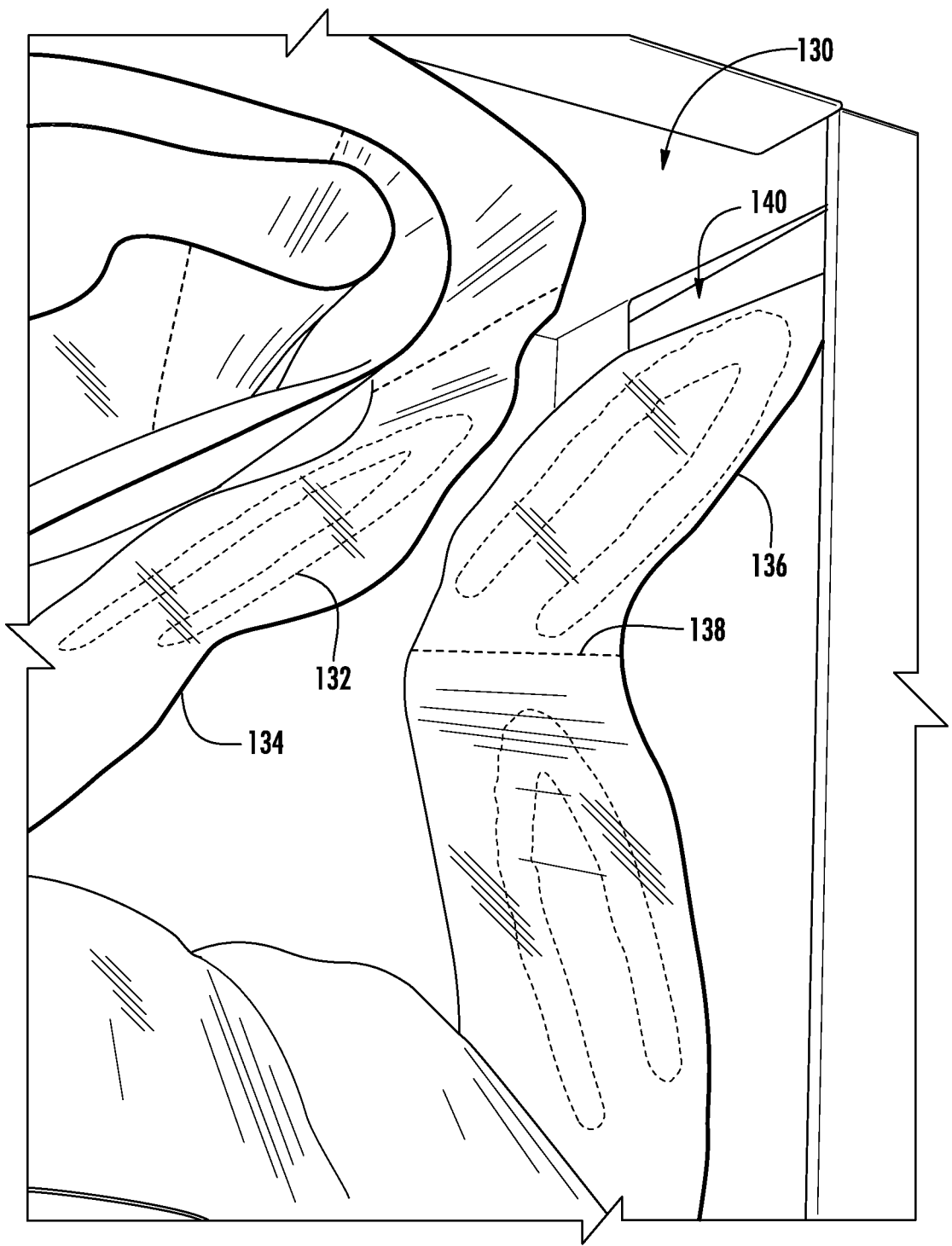
FIG. 8 is a top view of a number of packaged dental aligners arranged inside the bottom compartment of FIG. 6, according to an exemplary embodiment.
Figure 8A:
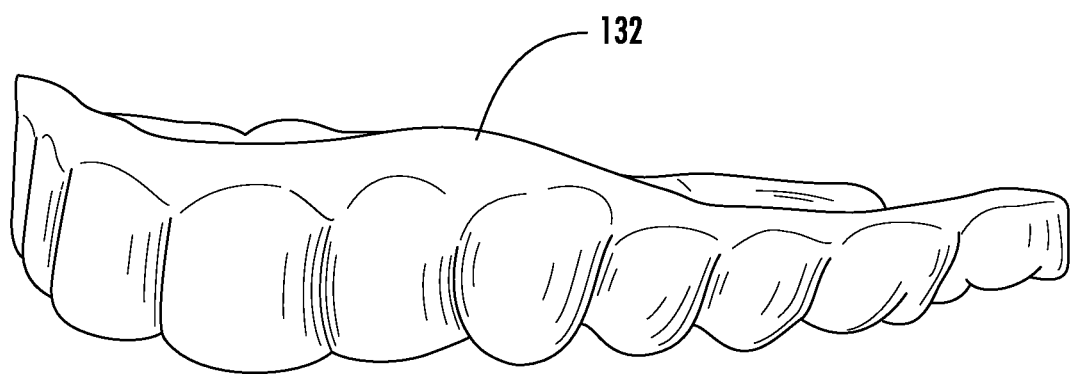
FIG. 8A is a side perspective view of a dental aligner, according to an exemplary embodiment.

Referring now to FIGS. 6 and 7, a top perspective view and a side perspective view, respectively, of the container 100 with the bottom compartment 130 opened is shown. As shown in FIGS. 6 and 7, the bottom compartment 130 contains a number of dental aligners 132. The dental aligners 132 in the bottom compartment 130 are further illustrated in FIG. 8. In some embodiments, as shown in FIG. 8, the dental aligners 132 are each contained within individual packages 134. FIG. 8A illustrates a side perspective view of an example dental aligner 132. As shown, the dental aligner 132 is shaped to fit over the user's teeth. The configuration of the dental aligner 132 can be based on an intermediate alignment position that the user's teeth will be guided through to reach the final aligned positions. As such, the dental aligner 132 is configured to fit over the user's teeth to thereby guide the user's teeth into the intermediate alignment position while the user is wearing the dental aligner 132.

Referring back to FIG. 8, the individual packages 134 containing the dental aligners 132 for the user are separably connected together in a strip 136 with perforations 138 provided between each of the individual packages 134. In this way, the dental aligners 132 are all packaged together and linked together, and individual dental aligners 132 may be removed from the strip 136 by ripping an individual package 134 from an end of the strip 136 along the perforations 138. Accordingly, in some embodiments, the dental aligners 132 are packaged in the individual packages 134 and provided in the strip 136 in the predetermined order the dental aligners 132 are intended to be worn according to the user's treatment plan. As such, the user can rip off the next individual package 134 from the strip 136 to produce the next dental aligner 132 that the treatment calls for the user to wear. Providing the dental aligners 132 in the strip 136 may therefore decrease user confusion as to which dental aligner 132 should be worn next in the predetermined order because the user need only rip off the next individual package 134. Moreover, providing the dental aligners 132 in the strip 136 ensures the dental aligners 132 remain in the correct order specified by the treatment plan even if the dental aligners 132 are spilled from the container 100 or the container 100 is otherwise handled in a way that would cause unlinked, individually packaged dental aligners 132 to become disorganized (e.g., due to shipping or mishandling by the user).

Figure 9:
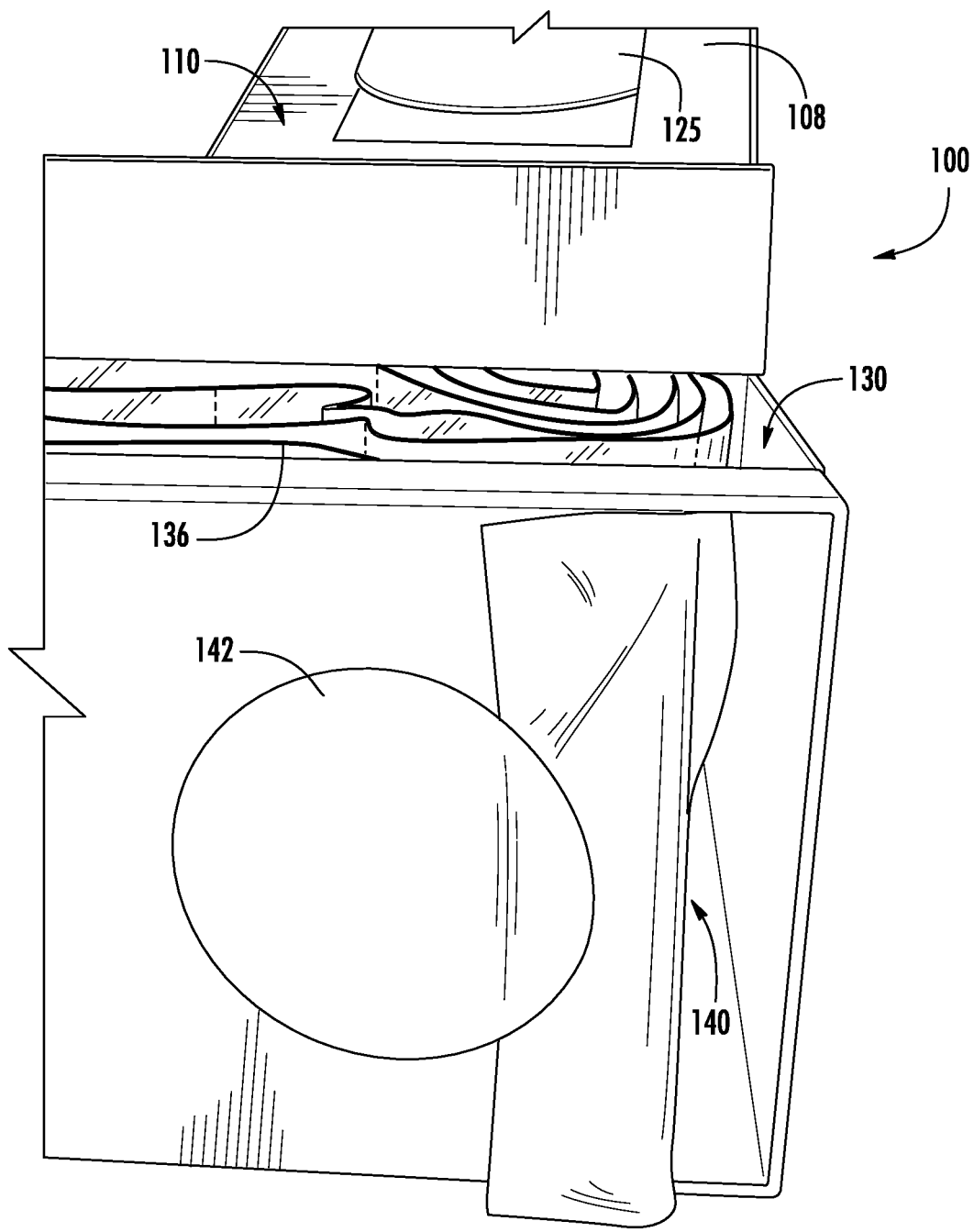
FIG. 9 is a side view of the bottom compartment of FIG. 6, according to an exemplary embodiment.

Furthermore, in some embodiments, the bottom compartment 130 includes a slot 140 in the front of the bottom compartment 130, as shown in FIG. 8. The slot 140 is wide enough to receive the strip 136 of dental aligners 132 and for an individual package 134 containing a dental aligner 132 to be pulled through the slot 140. As shown in FIG. 9, which illustrates a side view of the bottom compartment 130, the slot 140 is further configured such that the individual package 134 may be pulled out of the bottom compartment 130 without opening the bottom compartment 130. In this way, the user may pull out and separate the next individual package 134 from the strip 136 through the slot 140, and the bottom compartment 130 need only be opened to load the strip 136 of dental aligners 132 into the bottom compartment 130. Additionally, as illustrated in FIG. 9, at least the first individual package 134 in the strip 136 may be secured to the side of the bottom compartment 130 by a sticker 142 such that one or more individual packages 134 are not pulled out prematurely (e.g., such that the individual packages 134 do not fall out during shipping).

In some embodiments, the strip 136 may also be wound or folded up in a particular way in the bottom compartment 130, for example, to facilitate pulling out the individual packages 134 through the slot 140. As an illustration, the strip 136 may be wound in a roll such that the strip 136 is pulled through the slot 140 from the outside of the roll. Further, in some embodiments, to additionally ensure that the user uses the correct dental aligner 132, the individual packages 134 may include markings identifying how the dental aligner 132 contained therein fits into the predetermined sequence of dental aligners 132. As an illustration, the individual packages 134 may be numbered in the order of use such that the individual package 134 holding the first dental aligner 132 that the user should use is labeled "1" and positioned nearest the slot 140 (e.g., the individual package 134 labeled "1" is the individual package 134 secured to the bottom compartment 130 with the sticker 142). The subsequent individual packages 134 in the strip 136 are labeled in sequential order.

Additionally, in some embodiments, different users may require different numbers of dental aligners 132 based on the length of the users' treatment plans. For example, users may have treatment plans scheduled over five to twelve or more months, with the length depending on the amount or types of movements that the user's teeth are to be guided through using the dental aligners 132 to reach the planned final aligned positions. As such, the bottom compartment 130 may be modified to fit different numbers of dental aligners 132 for different treatment plans. In some arrangements, the bottom compartment 130 may be sized to fit a strip 136 of dental aligners 132 for twelve or more months. If the user's treatment plan is for less than twelve months, and the user accordingly has fewer dental aligners 132 provided to him or her, the bottom compartment 130 may be fitted with a spacer designed to decrease the amount of interior space in the bottom compartment 130 for holding the dental aligners 132. The spacer may be, for example, a cardboard insert or a hollow cardboard box configured to fit the width of the bottom compartment 130. The spacer may help maintain the strip 136 of dental aligners 132 in order while, for example, the container 100 is shipped to the user (e.g., such that the strip 136 of dental aligners does not slide around the bottom compartment 130 during shipping). In this way, a single size of container 100 may be used for users having different lengths of treatment plans. In some arrangements, the spacer may be adjustable or provided in different sizes in order to tailor the amount that the interior space in the bottom compartment 130 is decreased according to the user's individual treatment plan and number of dental aligners 132.

In some embodiments, the bottom compartment 130 is configured to be used as a pull drawer after the user has used all of the dental aligners 132. For example, the bottom compartment 130 may be pulled out of the container 100, flipped around so that the slot 140 is in the back (e.g., such that items inserted into the bottom compartment 130 do not fall out of the front of the bottom compartment 130 through the slot 140), and reinserted into the container 100 to be then used as a pull drawer. Additionally, in some versions, the back side of the bottom compartment 130 includes a handle or tab such that, when the bottom compartment 130 is flipped around, the handle or tab is in the front for use to enable the user to use the pull drawer.

In some embodiments, the bottom compartment 130 is configured to hold items that are not dental aligners 132. As an illustration, the bottom compartment 130 may be pulled out and reversed following the completion of a treatment plan, creating a storage drawer with a cut-out pull for personal effects. The insert 112 may also be removed from the top compartment 110, creating an additional compartment for personal effects.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps. It is important to note that the construction and arrangement of the systems and methods of marking dental aligners as shown in the various exemplary embodiments is illustrative only. Additionally, any element disclosed in one embodiment may be incorporated or utilized with any other embodiment disclosed herein. It should be appreciated that other elements of the various embodiments may be incorporated or utilized with any of the other embodiments disclosed herein.

What is claimed is:

1. A container for dental aligners, comprising:
a top compartment;
a removable bottom compartment;
a top flap configured to meet together with a portion of the container covering a side of the bottom compartment to close the container such that the top compartment and the bottom compartment are not accessible when the container is closed; and
a plurality of individually packaged dental aligners separably connected in a strip;
wherein the bottom compartment is configured to receive the plurality of individually packaged dental aligners when the bottom compartment is removed from the container, and wherein the bottom compartment further includes a slot through which an individually packaged dental aligner can be pulled and separated from the strip when the bottom compartment is positioned within the container.

2. The container of claim 1, wherein the top compartment is configured to contain at least one dental supply and/or at least one dental aligner supply.

3. The container of claim 1, further comprising an insert configured to fit inside the top compartment.

4. The container of claim 3, wherein the insert is configured to receive one or more items relating to use of the dental aligners.

5. The container of claim 4, wherein the insert is raised and is removable from the top compartment such that at least a dental appliance can be stored underneath the insert in the top compartment.

6. The container of claim 1, wherein the slot is configured such that an individually packaged dental aligner can be pulled from the bottom compartment and separated from the strip without at least partially pulling out the bottom compartment from the container.

7. The container of claim 1, wherein the plurality of individually packaged dental aligners are connected in the strip in an order in which the dental aligners are intended to be worn by a user according to a treatment plan for the user.

8. The container of claim 1, wherein the portion of the container covering the side of the bottom compartment covers at least the entire side of the bottom compartment.

9. The container of claim 1, wherein the top flap and the portion of the container covering the side of the bottom compartment each contains a magnet such that the container is configured to close magnetically.

10. A method for packaging dental aligners, comprising:
providing a container including a top compartment and a removable bottom compartment;
loading a plurality of individually packaged dental aligners separably connected in a strip in the bottom compartment when the bottom compartment is removed from the container; and
inserting the loaded bottom compartment into the container, wherein the bottom compartment further includes a slot through which an individually packaged dental aligner can be pulled and separated from the strip when the bottom compartment is positioned within the container;
wherein the container further includes a top flap configured to meet together with a portion of the container covering a side of the bottom compartment to close the container such that the top compartment and the bottom compartment are not accessible when the container is closed.

11. The method of claim 10, further comprising loading at least one dental supply and/or at least one dental aligner supply in the top compartment.

12. The method of claim 10, wherein the container further includes an insert configured to fit inside the top compartment.

13. The method of claim 12, wherein the insert is configured to receive one or more items, and wherein the method further comprises loading the one or more items into the insert.

14. The method of claim 13, wherein the insert is raised and removable from the top compartment, and wherein the method further comprises:
    loading at least one dental appliance in the top compartment; and
    placing the insert above the at least one dental appliance in the top compartment.

15. The method of claim 10, wherein the slot is configured such that an individually packaged dental aligner can be pulled from the bottom compartment and separated from the strip without at least partially pulling out the bottom compartment from the container.

16. The method of claim 10, wherein the plurality of individually packaged dental aligners are connected in the strip in an order in which the dental aligners are intended to be worn by a user according to a treatment plan for the user.

17. The method of claim 10, wherein the portion of the container covering the side of the bottom compartment covers at least the entire side of the bottom compartment.

18. The method of claim 10, wherein the top flap and the portion of the container covering the side of the bottom compartment each contains a magnet such that the container is configured to close magnetically.

19. A container for dental aligners, comprising:
    a top compartment;
    an insert configured to fit inside the top compartment;
    a removable bottom compartment configured to be pulled out of the container;
    a top flap configured to meet together with a portion of the container covering a side of the bottom compartment to close the container such that the top compartment and the bottom compartment are not accessible when the container is closed; and
    a plurality of individually packaged dental aligners separably connected in a strip in an order in which the dental aligners are intended to be worn by a user according to a treatment plan for the user;
    wherein the bottom compartment is configured to receive the plurality of individually packaged dental aligners when the bottom compartment is pulled out of the container, and wherein the bottom compartment further includes a slot through which an individually packaged dental aligner can be pulled from the bottom compartment and separated from the strip without at least partially pulling out the bottom compartment from the container when the bottom compartment is positioned within the container.

20. The container of claim 19, wherein the insert is raised and is removable from the top compartment such that one or more items can be stored underneath the insert in the top compartment.

* * * * *